United States Patent
Hayashi et al.

(10) Patent No.: US 7,991,543 B2
(45) Date of Patent: Aug. 2, 2011

(54) NAVIGATION APPARATUS AND METHOD FOR STREET SEARCH

(75) Inventors: Kengo Hayashi, Inazawa (JP); Takashi Ishizaki, Kariya (JP)

(73) Assignee: DENSO CORPORATION, Kariya-City (JP)

( * ) Notice: Subject to any disclaimer, the term of this patent is extended or adjusted under 35 U.S.C. 154(b) by 631 days.

(21) Appl. No.: 12/076,862

(22) Filed: Mar. 25, 2008

(65) Prior Publication Data

US 2008/0243369 A1    Oct. 2, 2008

(30) Foreign Application Priority Data

Mar. 28, 2007 (JP) ................................. 2007-084581

(51) Int. Cl.
G01C 21/00 (2006.01)
G08G 1/123 (2006.01)
G06F 17/30 (2006.01)

(52) U.S. Cl. ........ 701/200; 701/201; 701/209; 707/101; 715/256

(58) Field of Classification Search .................. 701/200, 701/209, 201; 707/4, 3, 6, 101, E17.014; 715/256, 255
See application file for complete search history.

(56) References Cited

U.S. PATENT DOCUMENTS

| | | | | |
|---|---|---|---|---|
| 5,825,306 A * | 10/1998 | Hiyokawa et al. | ............ | 340/988 |
| 6,088,649 A * | 7/2000 | Kadaba et al. | ................ | 701/201 |
| 6,112,153 A * | 8/2000 | Schaaf et al. | ................ | 701/200 |
| 6,115,669 A | 9/2000 | Watanabe | | |
| 6,947,834 B2 | 9/2005 | Duckeck | | |
| 7,664,597 B2 * | 2/2010 | Imanishi | ....................... | 701/209 |
| 2004/0104842 A1 * | 6/2004 | Drury et al. | .............. | 342/357.13 |
| 2004/0220907 A1 * | 11/2004 | Camarillo | ..................... | 707/3 |
| 2008/0243376 A1 * | 10/2008 | Yokota et al. | .................. | 701/209 |

FOREIGN PATENT DOCUMENTS

| | | |
|---|---|---|
| DE | 199 27 280 | 1/2001 |
| DE | 199 41 949 | 3/2001 |
| DE | 10 2004 043 852 | 4/2006 |
| EP | 0 633 452 | 7/1994 |
| JP | A-H06-251295 | 9/1994 |
| JP | A-2002-048581 | 2/2002 |
| JP | A-2002-116042 | 4/2002 |
| JP | A-2003-005783 | 1/2003 |
| JP | A-2004-326321 | 11/2004 |

OTHER PUBLICATIONS

Office Action dated Jan. 6, 2009 in corresponding Japanese patent application No. 2007-084581 (and English translation).
Office Action dated Jan. 5, 2010 from the German Patent Office in the corresponding DE patent application No. 10 2008 015 987.5 (and English translation).

* cited by examiner

*Primary Examiner* — Tan Q Nguyen
(74) *Attorney, Agent, or Firm* — Posz Law Group, PLC

(57) ABSTRACT

When a character string for a street search is input in a vehicle navigation apparatus, street data are searched, and all streets which include the character string for the street search in the formal street name character string are extracted. The extracted street is displayed, in a list format on a display screen, by using a portion of the formal street name string that is registered as a proper noun part of the formal street name character string. The extracted streets are sorted in the list format so that a street with the proper noun part including the character string for searches comes to the top of listing of the extracted streets, thereby making it easy to find out a desired street in the listing of the extracted streets.

4 Claims, 7 Drawing Sheets

FIG. 2

| STREET | | | |
|---|---|---|---|
| PREFIX | BODY | STREET TYPE | SUFFIX |
| ⋮ | ⋮ | | |
| | 5TH | | SE |
| WEST | 5TH | AVE | |
| ⋮ | ⋮ | ⋮ | |
| EAST | MAIN | ST | |
| ⋮ | ⋮ | ⋮ | |
| WEST | MAIN | ST | |
| | ⋮ | | |
| | WEIST | | |
| | ⋮ | | |
| | WEIST | AVE | |
| NORTH | WEST | ST | |
| ⋮ | ⋮ | ⋮ | |
| WEST | WORST | ST | |
| ⋮ | ⋮ | ⋮ | |

FIG. 3A

| | BODY LIST |
|---|---|
| 1 | 5TH |
| 2 | MAIN |
| 3 | WEIST |
| 4 | WEST |
| 5 | WORST |

FIG. 3B

| | BODY LIST |
|---|---|
| 1 | WEIST |
| 2 | WEST |
| 3 | 5TH |
| 4 | MAIN |
| 5 | WORST |

FIG. 6A

STREET
HOUSE#
CITY

FIG. 6B

A B C D E F G H I J
K L M N O P Q R S T
U V W X Y Z - & #
A-Z  ←  LIST

A ○ ○ D E F ○ H I
○ L ○ N O P ○ R S ○
U ○ ○ ○ Y Z - & #
A-Z  ←  LIST

○ ○ ○ ○ ○ F ○ H ○ ○
○ L ○ ○ ○ P ○ R ○ ○
U ○ W ○ ○ ○ - & #
A-Z  ←  LIST

FIG. 6E

⤒ WEIST
▲ WEST
▼ 5TH
  MAIN
⤓ WORST

| STREET | WEIST |
| --- | --- |
| HOUSE# | 516 |
| CITY | ABC |

LIST

516  WEIST  ABC

516  WEIST  AVE  ABC

NAVIGATION APPARATUS AND METHOD FOR STREET SEARCH

CROSS REFERENCE TO RELATED APPLICATION

The present application is based on and claims the benefit of priority of Japanese Patent Application No. 2007-84581 filed on Mar. 28, 2007, the disclosure of which is incorporated herein by reference.

FIELD OF THE INVENTION

The present disclosure generally relates to a street search method and apparatus for use in vehicle navigation.

BACKGROUND INFORMATION

A vehicle navigation apparatus detects a current car position by Global Positioning System (GPS), and displays a map around the current car position on the screen of a display unit. Further, the navigation apparatus indicates the current car position on the map, so that the car travels toward a desired place smoothly with the support of the navigation apparatus.

In addition, when a destination is set in the vehicle navigation apparatus, the navigation apparatus searches for guidance courses from a departure place (usually, from the current position) to the destination, and the guidance course is displayed with a color that is different from a normal road color on the map of the display unit, and the guidance course is guided for a travel guidance toward at the crossings or the like in terms of the progress direction by providing voice guidance or the like.

In the vehicle navigation apparatus that is capable of providing course guidance, there are various kinds of destination setting methods such as by an input of the phone number, by the address, by the name and the like. In the case of a destination search by the address, street name input are necessary because, in Europe and America in particular, street names are used to represent an address of a house (for example, referred to Japanese patent documents JP-A-H06-251295 and JP-A-H09-212086). In addition, a destination address search method by an input of a street name is designated by a name of "destination search" in the following description.

In Europe and America, the name of the street consists of plural parts (In this case a "part" indicates a portion of an entire name of a street or the like). The plural parts include a part called a body (Body, the subject or main part of the name) which is the proper noun of the street, a prefix and a suffix in front or behind the subject part (Prefix: a head and Suffix: a tailpiece) which indicates attributes such as a direction or the range of the street, and a street type (Avenue, Road or the like). In the following discussion, when the street name is represented by using all of the body, prefix/suffix and the street type, it is designated as a formal name (a full name of a street), and when the street name is represented by using only of the body, it is designated as a body name (a distinguishable name of a street among other streets).

Conventionally, vehicle navigation apparatus has two model types, that is, a model that demands the formal name of the street as the street name input (i.e., choosing a street from a street name list and specifying the street as, for example, the destination) and a model that demands the body name of the street as the street name input in an address search. However, when an address is represented in Europe and America, only the body name is used with other parts omitted in many occasions, (e.g., a signboard on a roadside which displays the name of a street, an invitation letter or the like). Thus, it is generally assumed that the body name is very likely recognized as the street name.

When the navigation apparatus is a model that demands the formal name input, a user cannot search for a street when only the body name of the street is known. For example, when the body name is input to the model that demands the formal name of the street, all of the streets with the body name are listed in the formal names. Therefore, the user must choose a desired street to from the listed streets. However, if the user does not know the formal name of the street, the street search stalls at that point. That is, the street can not be searched any further. Therefore, in Europe and America, people tend to prefer the navigation apparatus of a model that performs the street search by the body name.

On the other hand, if the navigation apparatus is the model that demands the body name input, the street search stalls when other parts are input besides the body part. That is, in this case, even the list of the street names cannot be displayed. For example, when the user inputs a street name by referring to a business card or the like, and the business card only lists the formal name of the street, the street name may be input in the formal name format as appeared on the card, thereby making it impossible to search an address based on the input street name.

SUMMARY OF THE INVENTION

In view of the above and other problems, the present disclosure provides a vehicle navigation apparatus that searches for a street when a string of a street name is input in a formal name format or when the street name is specified by only one character. The navigation apparatus is further capable of listing the searched streets by, for example, body names of the streets with a sorting that prioritizes a search string in the body names of the street names, thereby making it possible to promptly find a desired street in the street name list.

When character string for searches is given in the navigation apparatus, street names having a matching string to the given character string in the character string of the name of the street stored in a data storage are searched for, and searched streets are displayed on a display unit by using a display string in an order that prioritizes a search string in the display string. Further, the display string containing the search string is defined as a predetermined string portion in the street name string when the street name string is stored in the divisional manner, and the display string containing the search string is defined as the street name string itself when the street name string is stored in the continuous manner.

Therefore, the user can search for the street even if the formal name of a street described above is not known, or only if the above-mentioned body name or the character string of a part of the body name is input. Further, when the searched streets are listed on the display unit, street listing displays the body names of the streets for example, thereby making it possible for the user to select and/or specify a desired street when the user does not know formal name of the street. Furthermore, the desired street can be promptly found out from many listed streets due to the prioritization of the sorting of the list of the display string in a manner that lists the display string including the search string first when the display string is used for street name listing. That is because the user usually uses a commonly used name of the street that may highly likely be, for example, the body name of the street.

BRIEF DESCRIPTION OF THE DRAWINGS

Other objects, features and advantages of the present invention will become more apparent from the following detailed description made with reference to the accompanying drawings, in which:

FIG. 2 shows a diagram of contents of a street data storage;

FIGS. 3A and 3B show illustrations of searched street listing;

FIGS. 6A to 6E show illustrations of a display unit in a course of input process of a search string.

DETAILED DESCRIPTION

Figure 1:
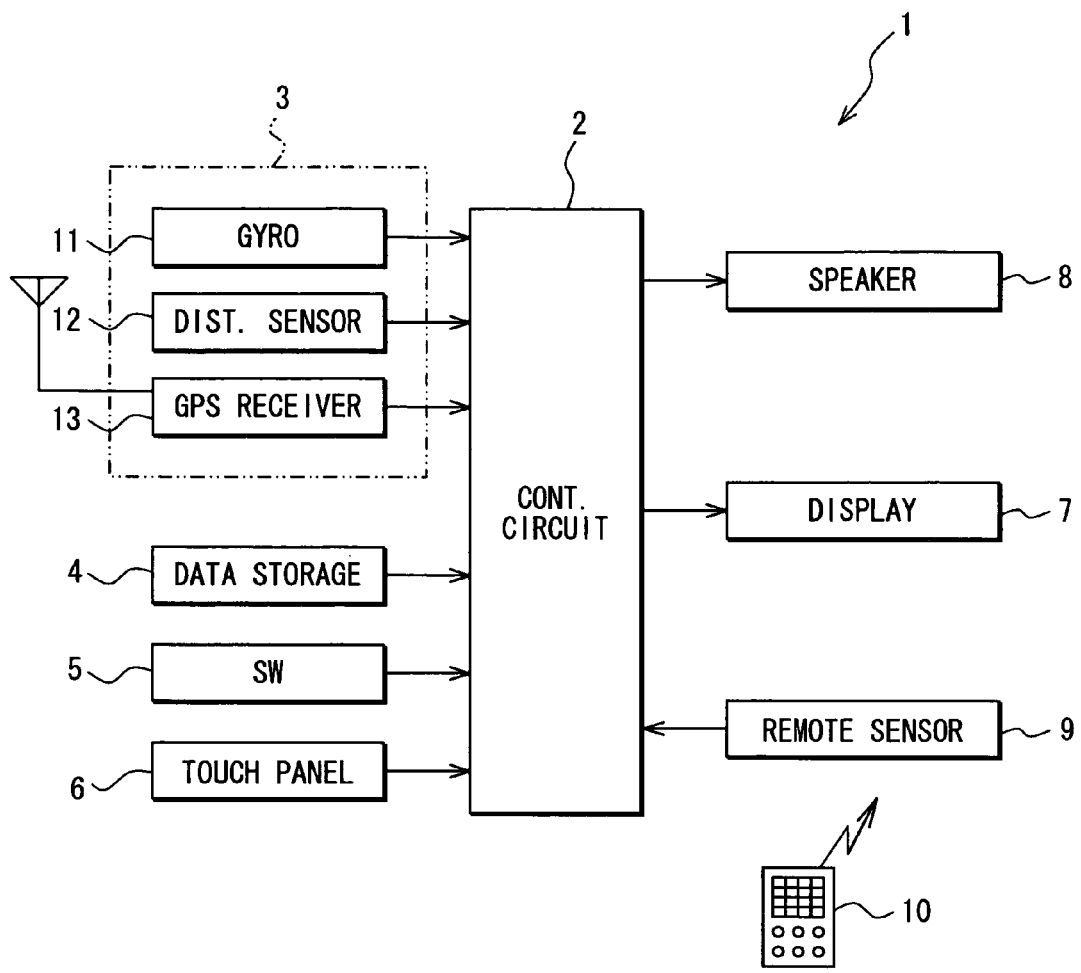
FIG. 1 shows a block diagram of an electric configuration of a vehicle navigation apparatus in an embodiment of the present disclosure.

One embodiment of the present invention is explained based on a drawing as follows. FIG. 1 is a block diagram showing electric constitution of a vehicle navigation apparatus 1. The vehicle navigation apparatus 1 has a control circuit 2 for the control of the apparatus, a position sensing device 3 as the position sensing unit, a data storage device 4, an operation switch group 5, a touch panel 6, a display unit 7 as a display device, a speaker 8, a wireless remote controller sensor 9, a wireless remote controller 10 paired with the remote controller sensor 9 and the like.

The control circuit 2 has a function to control the entire operation of the vehicle navigation apparatus 1, and the control circuit 2 uses a microcomputer as its main part. That is, the control circuit 2 has a CPU, a ROM, a RAM, an I/O, buses to interconnect these parts (none of them are illustrated), and the like. Among these parts, the ROM stores an execution program to operate the vehicle navigation apparatus 1, and the RAM temporarily stores map data acquired from the data storage 4, temporary data for program execution and the like.

The position sensing device 3 consists of a gyroscope 11, a range sensor 12 and a GPS receiver 13. Because these sensors 11-13 have detection error of different property, the sensors 11-13 can be combined for higher accuracy of position detection by mutual compensation. In addition, it is not necessary to always use all of the sensors 11-13 depending on required detection accuracy, that is, some of the sensors among those may be selected for use. Furthermore, wheel sensors detecting the rotation of each tire and/or a rotary sensor detecting the rotation of the steering wheel may also be employed as a part of the position sensing device 3.

For example, the data storage 4 includes an information recording medium such as DVD-ROM and an information reader reading data from the information recording medium, and data are read from the information recording medium by the reader to be input into the control circuit 2. In this case, the data storage 4 stores map data, data for map matching, sound data to guide a course, position data to search for a position in the map from the addresses mentioned later, genre data to search for a destination according to a genre, street data to represent a street in the map by a formal name and the like. Therefore, the data storage 4 functions as a map data storage, a position data storage and a street data storage.

The display unit 7 includes a liquid crystal display as a display screen that displays map data, a letter, signs, and the like, and, a transparent touch panel 6 is stuck on the surface of the liquid crystal display. The operation switch group 5, the touch panel 6, and the wireless remote controller 10 serve as an input unit that inputs data, setting items, and various inputs regarding destination setting. The operation switch group 5 includes button switches which, for example, are disposed around the liquid crystal display.

The control circuit 2 provides a function as the display control unit, and calculates the current position of the vehicle based on information input from the position sensing device 3, and displays a road map around the current position based on the map data on the liquid crystal display of the display unit 7, and also displays a pointer which shows the current position of the vehicle and a progress direction on the displayed road map. The scale of the road map displayed on the display screen can be changed by an operation of the operation switch group 5.

The control circuit 2 has a function to set the course to the destination and a function to provide guidance that directs by a sound the course of the vehicle to be output from the speaker 8. That is, when the operation switch group 5, the touch panel 6 or the wireless remote controller 10 is operated to set a destination or a stop-by place, optimal paths from the current position to the destination are automatically searched for as guidance courses, and the guidance courses are displayed with a color that is different from the normal road color on the road map displayed on the liquid crystal display of the display unit 7. Further, the control circuit 2 outputs the directions or the like by voice based on the guidance course. In addition, as a method to set the optimal path, Dijkstra method or the like may be used.

The map data which the data storage 4 memorizes has link information and node information to display a map to a liquid crystal display of the display unit 7. That is, a road in the map is divided into plural number of links and nodes to represents critical points such as curves of a certain angle as well as a crossing, crossroads, a junction, and elements between the nodes. In this manner, nodes and links between each of the nodes represent a road and further constitute a map based on the connection of the roads.

The link information described above includes, for each of the links, information such as a unique link ID, a link length, coordinates of a start and end points of the link, road widths in the link, attributes such as road types (a national highway, a municipal road, a highway) and the like. The node information includes information of each of the nodes, a unique node ID, the coordinates of the node, and node attributes such as a three-dimensional crossing or multiple traffic lanes crossing.

Further, the position data which the data storage 4 stores is used to search for a position of a departure place, a stop-by place or a destination when the place is input by an address, a building name, an institution name, a crossing name, a phone number or the like. The position data is configured as map index data which associates an address (including a street and a house number), a building name, an institution name, a crossing name, a phone number with map coordinates corresponding to the address or the like.

The street data which the data storage 4 stores is data that represents streets in formal names as a string of characters by using, for example, alphabets memorized in the alphabetical order. The formal street name character string includes a body name string that forms a body of a proper name of a street as well as character strings of the prefix and suffix in front and behind the body name string and the like. In this case, the character string before and after the body name character string is generally named as an attached character string, and the body name character string and the attached character string or between the attached character strings are separated by a space. A space for separating the strings is considered as a part of the formal name character string.

An example of the street data is shown in FIG. 2. The street data is memorized as a character string of the formal name with plural number of divisions or without divisions depending on the form of the formal name. The number of divisions of the string is four at most, and the divisions are named as, from the top to the end, Prefix, Body, Street Type, and Suffix in the formal string.

When a street has a formal name that only has a body part without a prefix, suffix and a street type, the street is stored in the street data as entire string of the formal name classified as the body string. In the example of FIG. 2, the formal string of "WEIST" is the case, and the entire string of WEIST is stored as the body string. When the street name has a prefix, a street type, and a suffix, the formal name character string is divided into plural parts, and the divisions of the string are stored in the corresponding categories.

For example, when a string such as "WEIST/AVE ("/" represents a space in the following) that has a body part as well as other part (in this case, a street type part), the string of "WEIST" is memorized as the body part, and a string of "AVE" is memorized as a street type part. In addition, the space is excluded when the string is memorized. In the street data, streets are sorted in an alphabetical order of the body part.

When the street is searched for in a present embodiment, upon having an input of a search string, a street including the search string somewhere in the formal name character string is searched. In this case, the space is excluded from the search when the search string includes a space. For example, in the example of FIG. 2, there are six streets that includes "WE" in the formal name, that is, "WEST/5TH/AVE," "WEST/MAIN/ST," "WEIST," "WEIST/AVE," "NORTH/WEST/ST," and "WEST/WORST/ST" are shown. Then, six streets mentioned above are searched when a character string of "WE" is input as a search string for a search of formal name character strings. In addition, "WEST/MAIN/ST" is searched when a search string of "WEST/MAIN/ST" or "WEST-MAINST" is input for a search.

Then, the searched streets are displayed on the display screen of the display unit 7. In the list of the searched streets, the streets are represented by a display string instead of the formal name character string among the respective parts of the street data in FIG. 2. In the present embodiment, the character string of the body part is used as the display string, and the street names are displayed by the display strings. For example, six streets including the string of "WE" in the formal name are respectively represented as "5TH," "MAIN," "WEIST," "WEST," and "WORST" in the list.

Figure 4:
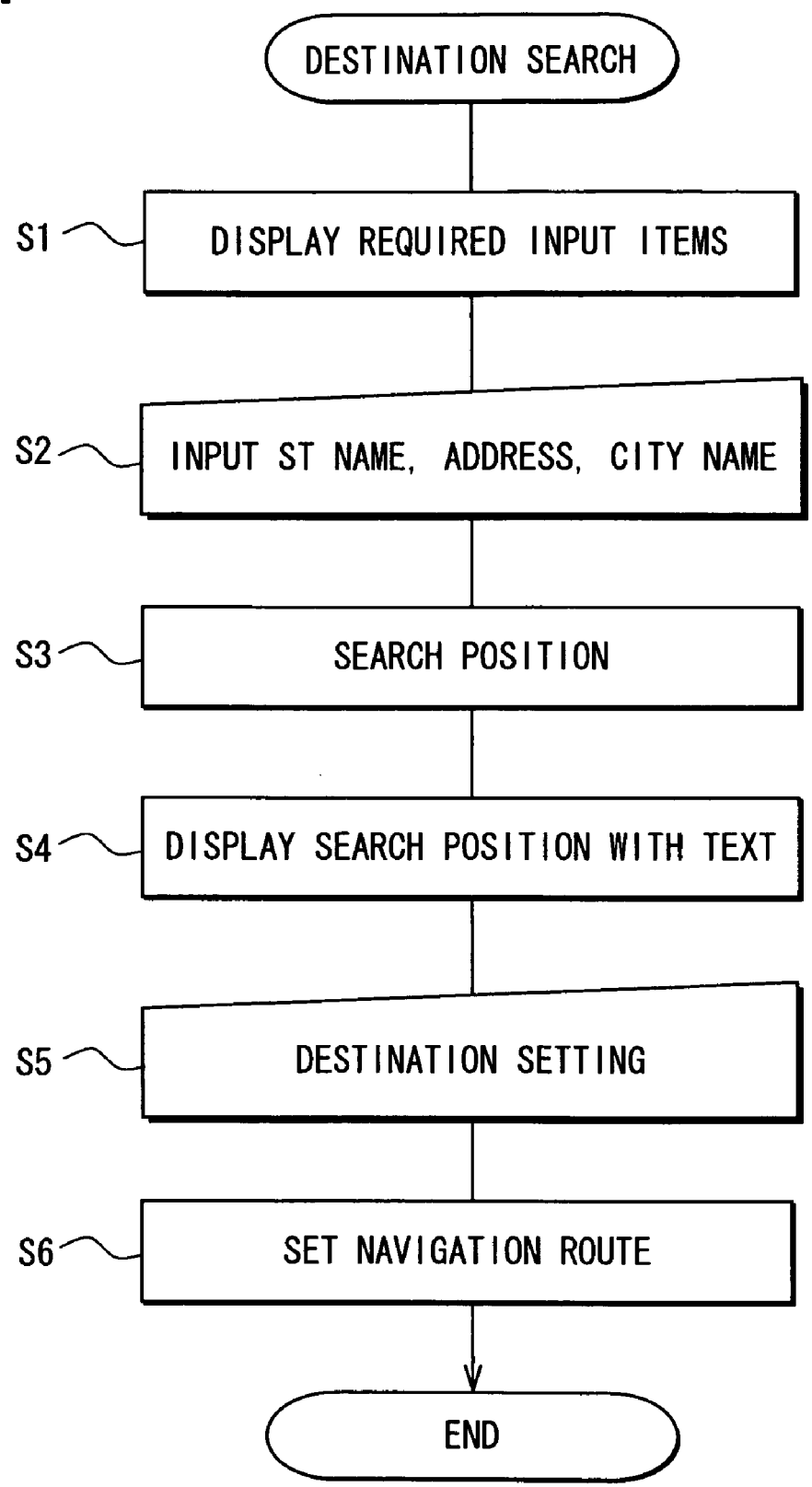
FIG. 4 shows a flowchart of a navigation route setting processing.
Figure 5:
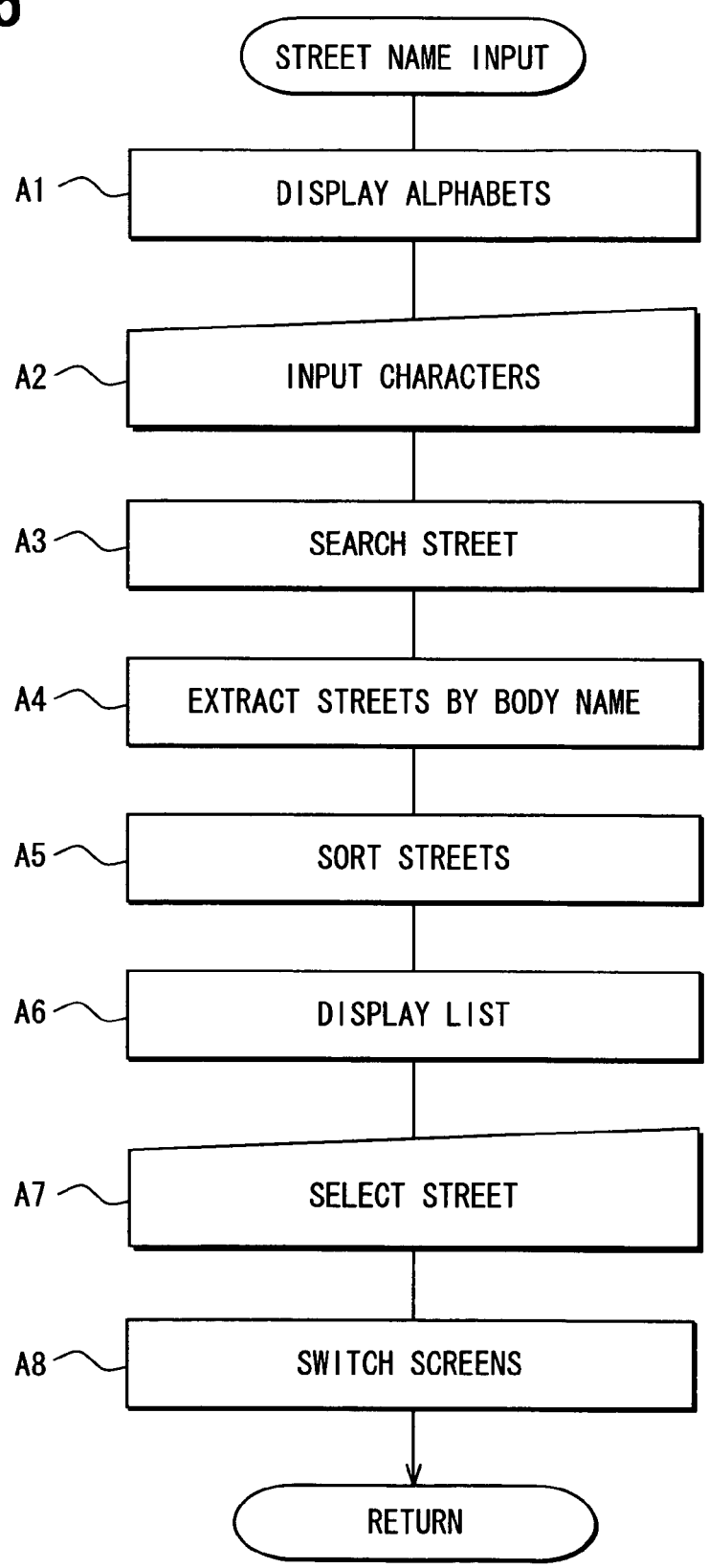
FIG. 5 shows a flowchart of a street search processing.

The above configuration is described as a process referring to a flowchart in FIG. 4 and FIG. 5. First, one of the operation switch group 5, the touch panel 6, or the wireless remote controller 10 is operated for using a guidance function of the vehicle navigation apparatus 1, and the vehicle navigation apparatus 1 is turned into a destination setting mode. Then, the control circuit 2 displays plural search methods such as an address search, a name search, the search according to genre on the display unit 7, and the user is asked to determine which one of the search methods is put in use for a destination search.

When the user chose the address search, the control circuit 2 starts the execution of a program routine for the destination search by the addresses as shown in FIG. 4, and required input items for the address search as shown in FIG. 6A is displayed on the display screen of the display unit 7 (step S1 in FIG. 4) (the display screen of the display unit 7 is simplified as the display unit 7 in the following). As for the input item for the address search, a city name (City in FIG. 6A), a street name (Street in FIG. 6A), and a house number (House # in FIG. 6A) are the three required items. If the user chose to input the street name among the three items, the control circuit 2 displays alphabets on the display unit 7 as shown in FIG. 6B by executing a street name input routine as shown in step A1 of FIG. 5.

The user uses the alphabet input screen to input the street name character string in order. For example, when the street which the user wishes for is "WEIST/AVE" by the formal name character string and the user only remember "WE" portion of the string, the user first presses a "W" part of the touch panel 6 for a street name input. Then, the control circuit 2 displays "W" in an upper part of the display screen of the display unit 7 as shown in FIG. 6C.

When the first character is displayed, the control circuit 2 searches for all streets that start with a character of "W" in a body, a prefix, a suffix, and a street type string by referring to the street data, and, for each of the streets starting with the character "W," the control circuit 2 searches for the second character alphabet in a body, a prefix, a suffix, and a street type. Then, candidate alphabets for the second character that are searched are highlighted, with other alphabets dimmed in contrast on the display unit 7.

Next, when the user selects "E" among the highlighted alphabets, the control circuit 2 as shown in FIG. 6D displays "E" next to "W" in the upper part of the display unit 7. Then, the control circuit 2 searches for all streets that start with a string of "WE" in a body, a prefix, a suffix, and a street type string by referring to the street data, and, for each of the streets starting with the string "WE," the control circuit 2 searches for the third character alphabet in a body, a prefix, a suffix, and a street type. Then, the alphabets for the third character that are searched are highlighted, with other alphabets dimmed on the display unit 7.

The above operation serves as an input of the string "WE" as the search string of the street search. The search string may be made of only one character. When the input of the search string is finished, the user presses a "List" part of the display unit 7 (step A2 of FIG. 5). Then, the control circuit 2 searches for streets including character string of "WE" in the formal name character string from the street data in the map data (step A3, the control circuit 2 provides a function of a street search unit).

When the search string is looked up in the formal name character string, the search string may be in one of the prefix, the body, the street type or the suffix. Further, the search string may be in the middle of the above parts as long the search string in the above parts is arranged in the required order. Because there are six streets of "WEST/5TH/AVE," "WEST/MAIN/ST," "WEIST," "WEIST/AVE," "NORTH/WEST/ST," and "WEST/WORST/ST" in the street data of FIG. 2, the control circuit 2 search the six streets in this case.

Subsequently, the control circuit 2 extracts five pieces of "5TH," "MAIN," "WEIST," "WEST," "WORST" as a list because the searched streets are displayed on the display unit 7 by using the string in the body part. (step A4). The list at this point lists, as shown in FIG. 3A, the street names in the recorded order of the street data. Then, the control circuit 2 sorts the five extracted strings as shown in FIG. 3B so that the strings including the search string of "WE" are listed on a top side of the list (step A5, a sort unit). Then, the control circuit 2 lists on the display unit 7 the five sorted character strings as shown in FIG. 6E (step A6).

Figures 7A, 7B, 7C:
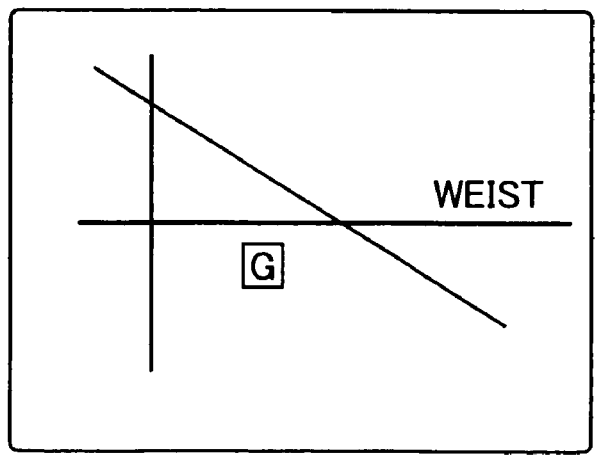
FIGS. 7A to 7C show illustrations of contents of the display unit in a course of destination search process.

If the user reminds that the desired street is "WEIST" at this point by reading the displayed list on the display unit 7, he/she selects the "WEIST" in the list (step A7). Then, the control circuit 2 switches a display screen on the display unit 7 into required input items for an address search, with the street name of "WEIST" put in Street portion of the screen as shown in FIG. 7A, because the "WEIST" is selected as a street name (step A8). Then, as the user sees that the street name is specified as "WEIST," he/she is prompted to input a next item to select House # or City.

When House # is chosen, the control circuit 2 displays numerical keys on the display unit 7, and the user presses the keys in an order of "5," "1," "6." Then, the control circuit 2 displays, as shown in FIG. 6A, "516" as House #, as the control circuit 2 assumes that "516" has been input as the house number. When City is chosen as the input item next, the control circuit 2 displays the alphabets as shown in FIG. 6B on the display unit 7. Then, the user operates List by pressing the screen after pressing the alphabet an order of "ABC," the user operates the List part after seeing that the City part is displaying "ABC" as shown in FIG. 7A with three items all completed (step S2 of FIG. 4).

When a position of an address is searched for based on the street name (in this case, "WEIST"), the city name, and the house number from among the position data that matches with all of the above inputs (step S3, the control circuit 2 provides a function of a point search unit), the control circuit 2 displays, for example, the position of a searched address as shown in FIG. 7B on the display unit 7 (step S4, the control circuit 2 provides a function of a display control unit). Because, in the example of FIG. 7B, the street can be only identified as "WEIST" due to the sameness of the search string and the selected street, the search result includes two addresses of "516/WEIST/ABC" and "516/WEIST/AVE/ABC" that include all of the strings of "516," "WEIST," and "ABC."

If the selected street (the body name) is "WEIST" and the search string is "WEIST/AVE," the street can be identified as the "WEIST/AVE," thus the control circuit 2 displays only one address of "516/WEIST/AVE/ABC" will be displayed on the display unit 7 as a result of search that searches for an address including all of a selected street of "WEIST" and a search string of "WEIST/AVE" together with a city name and a house number.

When there are plural addresses displayed on the display unit 7, the user chosen one from among the displayed address. When only one address is displayed, the displayed address is selected. Then, the control circuit 2 displays a place of G in this case on a map by referring to the position data and searching for the selected position on the display unit 7 as shown in FIG. 7C. When the user performs an operation to set the displayed position as a destination upon confirming that the displayed position is the desired destination (step S5), the control circuit 2 searches for the coordinates of the address concerned from the position data, and the searched position of the coordinates concerned is displayed as the destination together with a navigation route to the destination that is also searched for on a map of the display unit 7 (step S6). When the address selected does not accord with the desired destination, a return operation is provided in FIG. 7C to return to the screen in FIG. 7B, and selection of a different address with displaying a map is repeated.

When a destination is selected and set as the desired destination as shown in FIG. 7C (step S5), the address is set at the destination to be searched for, and a course toward the destination is searched and displayed on a map of the display unit 7 (step S6).

As mentioned above, the search string is used to search for the street that includes the search string in the body name, the street search is enabled by both of the formal street name input and the body name input, thereby facilitating the search function of the navigation system. The search is further facilitated by enabling the street search upon only having a part of the body name. Furthermore, when the searched street is displayed on the display unit, the body name is used for listing the searched streets, thereby enabling even a user who does not know the formal street name to select and set a street which he/she desires to have as the destination.

Furthermore, the order of the searched street on the display unit 7 is a descending order which prioritizes the body names including the search string, thereby facilitating the identification of the desired street. In other words, the search string can be input as the body name that is more recognizable and easy to specify for the user of the navigation system relative to the Prefix, Suffix and the Street Type. In addition, a character string of the body name may be entirely or partially input due to a convenience of the user or due to uncertainty of memory.

As a result, the list of the searched streets may have a volume of street names to be scrolled through if the street names are sorted in an alphabetical order. However, the street names in the present embodiment are sorted in an order that prioritizes the search string that is a most recognizable character string of the desired street, and the list displays the prioritized names on a top side in the list, thereby facilitating the selection and setting of the desired street.

Although the present invention has been fully described in connection with the preferred embodiment thereof with reference to the accompanying drawings, it is to be noted that various changes and modifications will become apparent to those skilled in the art.

For example, the entry sequence of three input items may be arbitrarily determined. That is, when a street is the first input, the subsequent inputs of City and House # may be tailored so that only available city names and street address in a former selection is allowed (i.e., highlighted) in the displayed keys as shown in FIG. 5B.

In the above embodiment, the state name may be added as an input item for address search.

In the above embodiment, the city name may be replaced with an input of a zip code.

Further, the input of the city name or its replacement is not required. For example, when only one street exists in a city, the city name is not a required input.

The street data as shown in FIG. 2 may include the body name character string besides the formal name character string of the street. In this case, a street indicated by the body name character string is displayed on the display unit 7 by the same body name character string to be used as the display character data.

The destination search of the present invention may be applied to the search of a midway destination (e.g., a stop-by place) on a way to the ultimate destination without being limited to the search of the ultimate destination of a travel.

The display string may take a form that accompanies, for example, a part of (i.e., the first letter of) the character string of the prefix, suffix or street type within parentheses in front or behind the body name character string as well as a form of the body name character string by itself.

The street data may memorize character strings of alphabet and/or other kind of characters including Japanese characters of Katakana, Hiragana, Kanji or the like.

Such changes and modifications are to be understood as being within the scope of the present invention as defined by the appended claims.

What is claimed is:

1. A method for street search by using a street data storage capable of storing, as a street name, a street name string in one of a divisional manner that uses a divider in the street name string to divide the string for storage and a continuous manner that spares use of the divider in the string for storage, wherein the street search takes place when a search string for the street search is provided, the method comprising:

searching the street data storage for the street name that includes the search string for the street search in the street name string; and displaying, on a display unit, a street search result list of searched streets by using a display string in an order that lists the display string having the search string contained therein on a top side of the street search result list, wherein the display string containing the search string is defined as a string portion in the street name string when the street name string is stored in the divisional manner in the street data storage, and wherein the display string containing the search string is defined as the street name string itself when the street name string is stored in the continuous manner in the street data storage.

2. The method for the street search of claim 1 further comprising:

providing a map data storage capable of storing map data that enables the display unit to display a map;

providing a position data storage capable of storing a position that is represented by a street name and a house number; and displaying a search position on the map on the display unit after searching the search position based on a selected street and a given house number when the selected street is selected from the street search result list on the display unit and the given house number is provided.

3. A navigation apparatus for use in a vehicle comprising:

a display unit;

a street data storage unit capable of storing street names with name strings in one of a sectioned format that has a division of sections put in the name strings and a sectionless format that has no division of sections put in the name strings;

an input unit capable of inputting searchable strings;

a street search unit capable of searching, for the name strings that include the searchable strings, the name strings stored in the street data storage unit;

a sort unit capable of sorting the name strings in an order that lists on a top side the name strings having searchable strings in display strings that is for use in displaying, wherein the display strings are constituted of one of a predetermined section of the name strings in the sectioned format and an entire string of the name strings in the sectionless format depending on a data format in the street data storage unit; and a control unit capable of listing, on the display unit, the display strings of the name strings being sorted by the sort unit.

4. The navigation apparatus of claim 3 further comprising:

a map data storage unit capable of storing map data for displaying a map on the display unit;

a position data storage unit capable of storing a position represented by a street name and a street address;

a selection unit capable of selecting a desired street from streets represented by using the display strings on the display unit; and a position search unit capable of searching a map for a position, upon having an input of the street address through the input unit, based on the desired street selected by the selection unit and the inputted street address, wherein the control unit displays on the display unit the map by using the map data stored in the map data storage unit, and displays on the map the position that is searched by the position search unit.

* * * * *